No. 789,632. PATENTED MAY 9, 1905.
W. H. SANDIFUR.
CORN PLANTER.
APPLICATION FILED JULY 1, 1904.
4 SHEETS—SHEET 1.
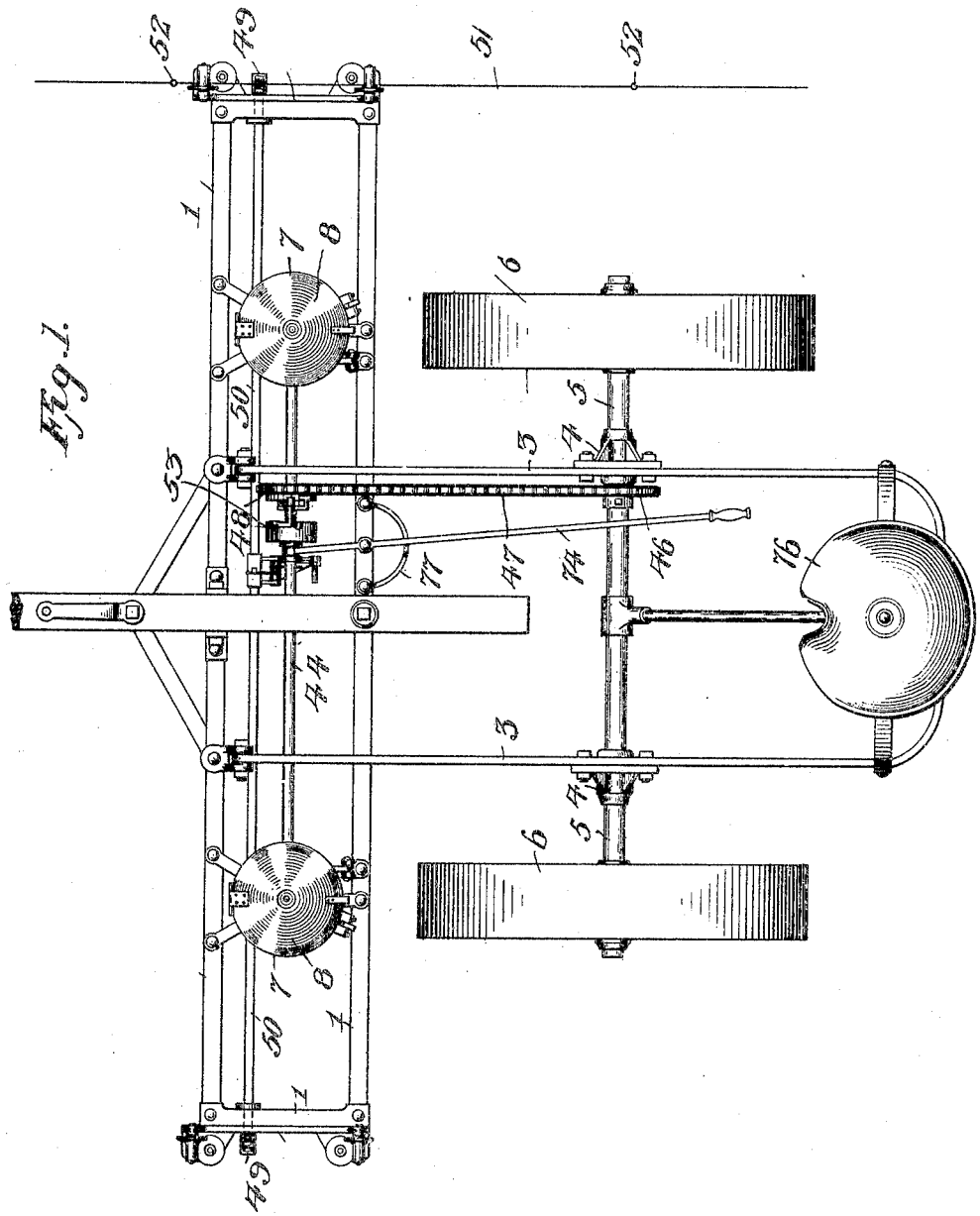
Witnesses.
Frank B. Hoffman
Katharine Allen
Inventor.
W. H. Sandifur.
By Victor J. Evans
Attorney.

No. 789,632. PATENTED MAY 9, 1905.
W. H. SANDIFUR.
CORN PLANTER.
APPLICATION FILED JULY 1, 1904.
4 SHEETS—SHEET 2.
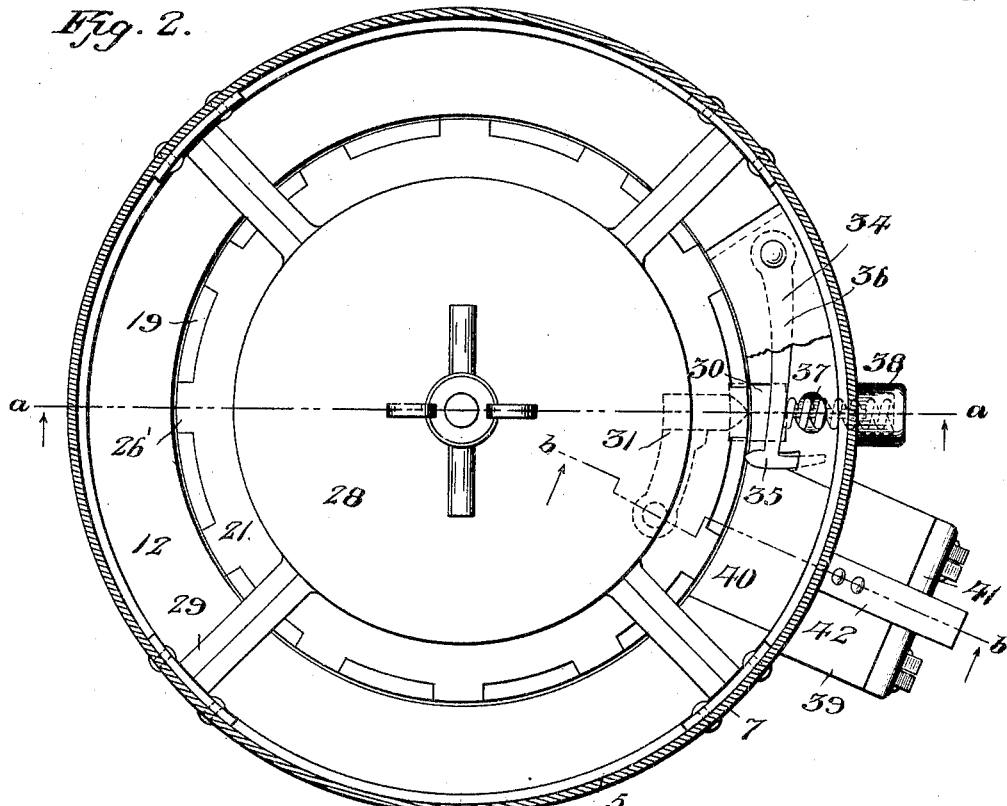
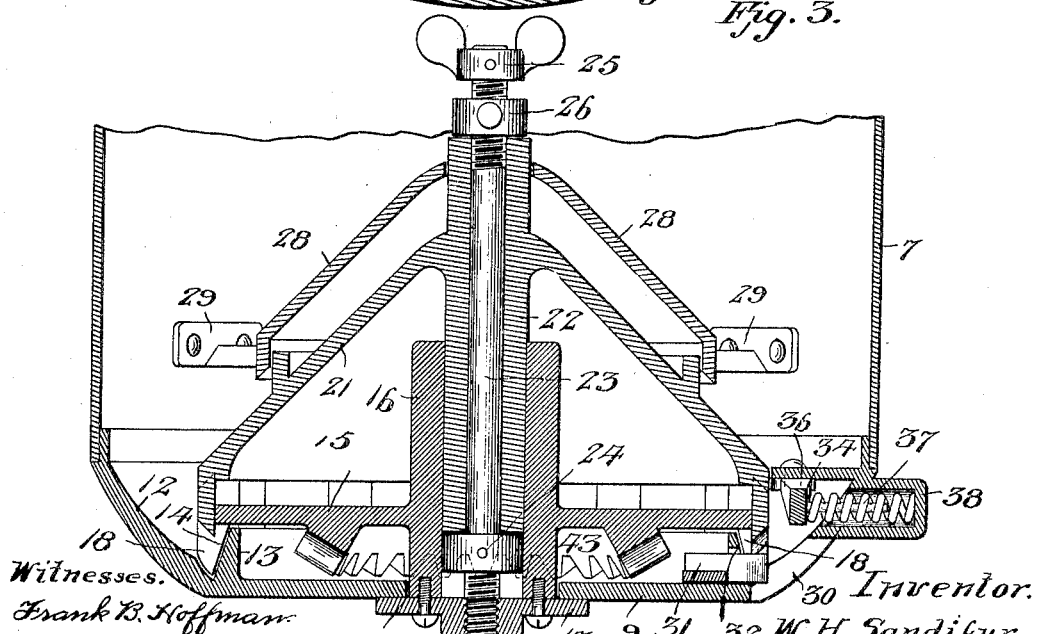

No. 789,632. PATENTED MAY 9, 1905.
W. H. SANDIFUR.
CORN PLANTER.
APPLICATION FILED JULY 1, 1904.
4 SHEETS—SHEET 3.
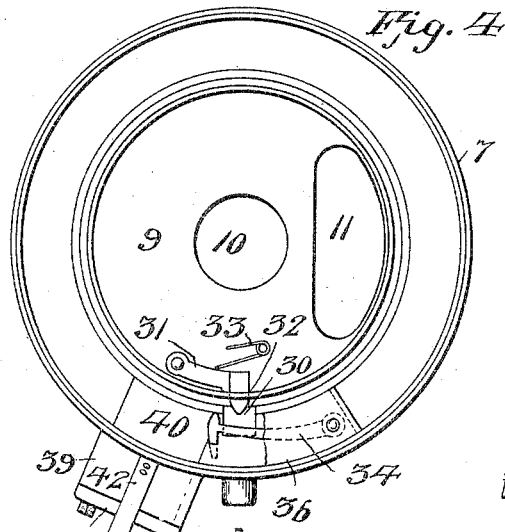
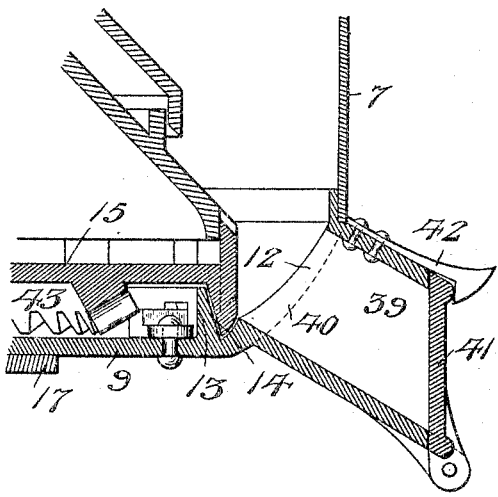
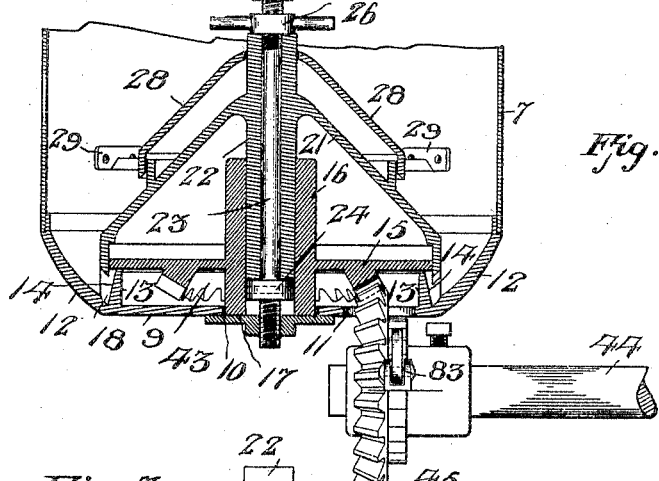
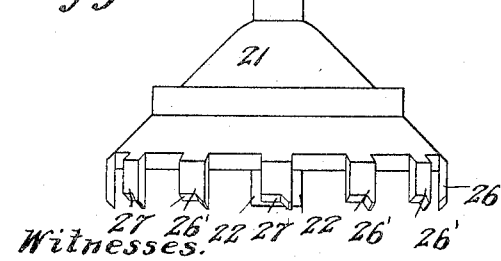
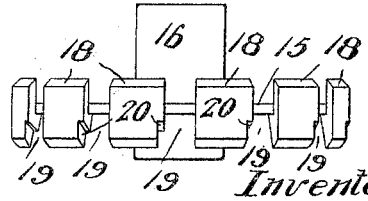
Witnesses.
Frank B. Hoffman.
Katharine Allen
Inventor.
W. H. Sandifur
By Victor J. Evans
Attorney.

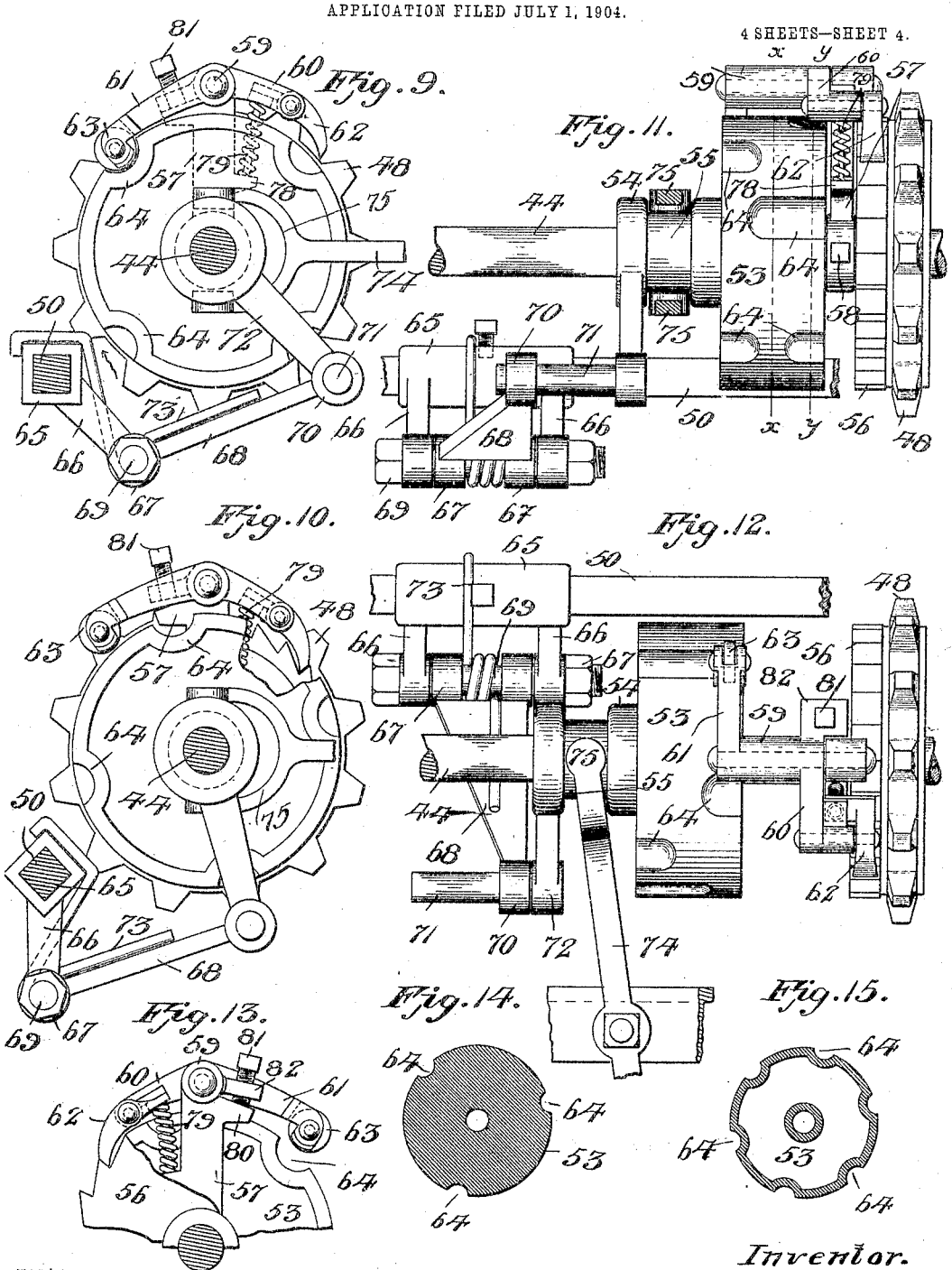

No. 789,632. Patented May 9, 1905.

UNITED STATES PATENT OFFICE.

WILLIAM H. SANDIFUR, OF BOWLING GREEN, OHIO.

CORN-PLANTER.

SPECIFICATION forming part of Letters Patent No. 789,632, dated May 9, 1905.

Application filed July 1, 1904. Serial No. 214,943.

*To all whom it may concern:*

Be it known that I, WILLIAM H. SANDIFUR, a citizen of the United States, residing at Bowling Green, in the county of Wood and State of Ohio, have invented new and useful Improvements in Corn-Planters, of which the following is a specification.

This invention relates generally to certain improvements in seed-planters of that class wherein the seed-distributing mechanism is suitably actuated to discharge a definite quantity of seed into the seed-tube at each operation. It has been heretofore proposed in machines of this class to provide suitable means to connect the seed-distributing mechanism and the power-wheels, so that the former will be intermittently operated by the latter to feed a fixed quantity of seed at each delivery. The main objection to such construction is that the capacity of the planter is limited and invariable, as once having made provision by the construction of parts for delivery of the seed from a certain number of seed-cups at each operation of the distributing mechanism the machine is thereafter limited to exactly this quantity. Hence the usual selection made in hand-planting to suit the varying nature of the soil of any particular field is prevented. I propose to entirely obviate this objection, and therefore the main object of the present invention is to provide adjustable mechanism for intermittently driving the seed-distributer whereby to vary the length of time of the operation of such seed-distributer, and hence discharge a variable quantity of seed to suit any particular requirements.

With this object in view the invention consists, first, in a clutch to operatively connect the wheel-power and seed-distributer and means to manually adjust the clutch to vary the length of time of its effective operation, and, second, in means for automatically setting the clutch and returning same to normal position without regard to its adjustment.

Other objects of the invention will be apparent from the following detailed description of the construction and arrangement of parts, taken in connection with the accompanying drawings, wherein is illustrated the preferred embodiment of structure, and in which—

Figure 1 is a plan view of a seed-planter constructed in accordance with my invention. Fig. 2 is an enlarged transverse sectional view taken through the seed-hopper above the seed-distributing mechanism. Fig. 3 is a vertical sectional view of the same, taken on the line $a\ a$ of Fig. 2. Fig. 4 is a plan of the seed-hopper with the seed-distributing mechanism omitted. Fig. 5 is a vertical section through the seed-hopper and contained mechanism, taken on a line at right angle to the section-line of Fig. 2 and showing the clutch-shaft in operative connection with said mechanism. Fig. 6 is an enlarged sectional view of a portion of the seed-hopper and contained mechanism, taken on the line $b\ b$ of Fig. 2, illustrating particularly the seed-discharge from the hopper. Fig. 7 is a view in elevation of a movable cone-plate for adjusting the size of the seed-cups. Fig. 8 is a view in elevation of the seed-cup plate. Fig. 9 is a side elevation of the clutch mechanism, showing the same in normal or inoperative position. Fig. 10 is a similar view showing the parts in operative position. Fig. 11 is a front elevation of the clutch mechanism. Fig. 12 is a top plan of the same. Fig. 13 is a detail elevation showing the clutch mechanism arranged for continuous drilling; and Figs. 14 and 15 are reduced sectional views of the clutch-drum, taken, respectively, on line $x\ x$ and $y\ y$ of Fig. 11.

Referring to the drawings, wherein like reference-numerals represent like parts throughout the several views, 1 represents the forward or runner frame of the planter, and 3 represents the rear or wheel frame, having hinged connection with the runner-frame and provided with journal-boxes 4 to revolubly support a transverse axle 5, on which is mounted the carrying-wheels 6. The wheels may be rigidly secured to the axle or may have any desired clutch connection therewith, it being essential, however, that the axle revolve in the forward movement of the planter.

In the instance shown the seed-distributing mechanism is duplicated for double dropping, and a detailed description of but one such will therefore be given.

The seed-distributing mechanism is contained within a hopper 7, supported on the runner-frame and having the usual cover or lid 8. The bottom of the hopper is formed by a plate 9, having a central opening 10 and an adjacent segmental opening 11. The plate 9 is of less diameter than the hopper and has an upwardly and outwardly extending circumferential wall 12, rabbeted on its upper edge 9' to receive the vertical wall of the hopper. Adjacent the lower end of the wall 12 the plate 9 is provided with a short vertically-extending circumferential flange 13, the outer surface of which is inclined, as shown at 14. The space between the flange 13 and the wall 12, which is the space or pocket from which the seed-cups receive the seed, it will be noted, is thus gradually reduced toward its bottom, which serves to prevent any excessive accumulation of seed at this point.

15 represents the seed-cup disk, comprising a horizontal plate about equal in size to plate 9 and having a central hub 16 of a size to fit in the opening 10 of plate 9 and projecting above and below the plate. A bearing-plate 17, secured on the under side of the plate across the opening 10, serves as a bearing for the lower end of hub 16 and supports the disk in proper position. The peripheral edge of disk 15 is provided with a series of vertically-extending blocks 18, regularly arranged to provide intermediate spaces 19, which spaces form the seed-cups. The blocks 18 are inclined on their inner surfaces below disk 15 and when assembled bear against the inclined face 14 of flange 13, as shown. The upper edges of the blocks are inclined to prevent retarding the movement of the seed, the lower edges being shaped to snugly fit the junction of the flange 13 with wall 12, as clearly shown in the drawings. The forward vertical edge in direction of movement of the disk is cut out at 20 to form a notch for a purpose hereinafter stated.

In order to adjust the size of the seed-pockets, I provide a cone-plate 21, mounted for coöperation with the seed-cup disk, comprising a truncated cone-shaped plate having a central hub 22 of a size to fit within hub 16 of the seed-cup disk. A rod 23 extends centrally through hub 22, its lower end having threaded connection with an opening formed in a central enlargement in bearing-plate 17, a fixed collar 24 on the rod serving as a bearing for hub 22 and properly supporting the cone-plate. The upper end of rod 23 projects above hub 22 and is provided with a fixed adjusting-nut 25 and with a lock-nut 26.

The lower edge of the cone-plate is provided with blocks 26' of such size and arrangement as when the parts are assembled to fit snugly within the spaces 19 between the blocks of the seed-cup disks, as shown. The rear vertical edges in the direction of movement of the blocks 26' are cut out at 27 to form, together with the contiguous notches of blocks 18, the seed-receiving recesses.

It is clearly evident that by turning the adjusting-nut 25 the cone-plate may be raised or lowered, hence changing the relative position of blocks 26' with regard to blocks 18 and increasing or decreasing the size of the seed-receiving recess to accommodate any desired quantity of seed. After adjustment the lock-nut may be turned to position to prevent accidental displacement of the parts.

I have thus provided for the ready and convenient adjustment of the cone-plate to vary the size of the seed-cups, as desired, it being understood that, as shown, the adjusting-nut is readily accessible by simply raising the hopper-lid.

In order to relieve the revolving cone-plate of a portion of the weight of the body of seed, I provide a guard-cone 28, secured to the inner surface of the hopper by strips 29, as shown. This guard-plate relieves the cone-plate of the weight of the seed, and hence permits free and easy adjustment of the latter.

The wall 12 of the hopper is formed with an escape-opening 30, arranged near its lower edge, to permit the escape of the seed from the seed-cups to a seed-tube, (not shown,) which may be of any desired type. Contiguous to this opening is located the knock-out or seed-ejector 31, comprising an angle-arm pivoted to plate 9, with its free end operative through an opening 32 in flange 13, and arranged to force the seed from the seed-cups as the latter are successively presented for its action. The free end of the lever is inclined to a point, so that the advancing wall of a block 18 will force the lever back against the tension of a spring 33, the end of the lever bearing against the inner surface of the block until the succeeding pocket or seed-cup is presented, when the spring operates to force the end of the lever through the seed-cup, thus forcing the contained seed into the outlet 30 and to the seed-tube. I also provide a cut-off 34 adjacent the knock-out, comprising a lever having an enlarged head 35 and pivoted at its rear end to a bridge-piece 36, joined to wall 12 near its upper end. A spring 37, located within a housing 38, formed integral with the bridge-piece 36, serves to normally press the head 35 of the cut-off against the surface of the revolving blocks 18 and 26'. The enlarged head serves to clear the advancing cups of any seed other than those contained within the cup and will hold back all other seed possibly advanced to this position, hence insuring the delivery to the outlet of only the seed contained in the cup.

It is desirable to provide means for the convenient discharge of all the seed within the hopper to permit of the convenient insertion of other variety of seed, and to this end I provide a discharge-spout 39, secured to the hopper and communicating therewith through an opening 40, formed in wall 12. A hinged cover 41 is provided for the delivery end of the spout, being held closed by a spring-catch 42.

The above-described seed-distributing mechanism in its broad features is known in the art, being particularly described and claimed in a patent issued to me February 16, 1904, No. 752,595.

A circular gear-rack 43 is secured to the lower side of disk 15, and this rack and all contiguous operable parts are suitably driven from what I term a "clutch-shaft" 44, supported in suitable bearings in the runner-frame 1 and having at its ends gear-pinions 45 effective through openings 11 in plate 9 to mesh with rack 43 and drive the disk 15 and coöperative parts. As there are two seed-distributing mechanisms shown, each end of shaft 44 will have a pinion, thus simultaneously operating both seed-distributers.

A gear 46 is fixed on main axle 5, from which a sprocket-chain 47 leads to a similar gear 48, loosely mounted on shaft 44. A clutch mechanism to be described operatively connects shaft 44 and gear 48 at determinate intervals, thus driving shaft 44 from the main axle.

Each end of the runner-frame supports a check-row head 49, which may be of any desired construction. A rock-shaft 50, preferably square in cross-section, projects from one head 49 across the runner-frame to the other head and is suitably rocked in operation by the usual check-row wire 51, having the usual tappets or buttons 52.

It has been heretofore proposed to operate a clutch member through influence of the check-row wire, whereby to operatively connect a continuously-driven power-sprocket with the seed-distributing mechanism and suitably operate the latter to discharge a predetermined number of seed into the seed-tube; but the main objection to such a construction is that in a specific machine the operation was always the same, and to alter the capacity of the machine as to the number of pockets discharged under the influence of the clutch mechanism was necessary to change the parts—that is, insert a new seed-cup disk having a relative greater number of pockets in the same space, as the length of travel of the seed-disk under the influence of the clutch was always the same. I propose, however, to entirely obviate this objection and to provide clutch mechanism so constructed and arranged that the operator may adjust the length of travel of the seed-cup disk as desired, and thus regulate the quantity of seed discharged in a single operation of the clutch mechanism to suit the requirements of the situation. The construction further provides for the adjustment during operation of the planter and by means of a lever convenient to the hand of the operator.

The improved clutch mechanism is mounted upon the clutch-shaft 44 contiguous to the sprocket-wheel 48 and comprises a clutch-drum 53, mounted loosely upon shaft 44 and having a laterally-projecting hub 54, formed with a circular recess 55. The sprocket-wheel 48 is provided with a fixed ratchet-wheel 56, and intermediate the ratchet-wheel and clutch-drum the shaft 44 is provided with a laterally-extending post or stud 57, preferably fixed to the shaft by a set-screw 58. A rod 59 is pivotally supported at the upper or free end of the stud in the same longitudinal plane on shaft 44 and is provided with two arms, one, 60, projecting rearward from the end of the rod next the ratchet-wheel 56 and the other, 61, projecting forward from the end of the rod next the clutch-drum. Arm 60 carries a pawl 62, arranged for engagement with ratchet-wheel 56, and arm 61 carries at its free end a roller 63 to engage any one of a number of depressions 64, formed in the peripheral surface of the clutch-drum and hereinafter more particularly described.

The rock-shaft 50 contiguous to the clutch mechanism is provided with a fixed collar 65, having projecting arms 66, to which arms are pivotally connected the eyes 67, projecting from one end of a triangular-shaped arm 68, a bolt 69 being properly used as the medium of connection. The opposite end of arm 68 has an eye or collar 70 designed to slidably embrace a stud 71, projecting from an arm 72, fixed to the free end of the hub 54 of the clutch-drum, all as clearly shown in Figs. 9 to 12, inclusive.

A spring 73 partially embraces collar 65 and coiled about bolt 69 between eyes 67, with its opposite end resting on the plate or arm 68, serves to normally maintain the parts in inoperative position, such as shown in Fig. 9.

Movement of the rock-shaft 50 under influence of the check-row wire, as before described, in the direction of the arrow in Fig. 9 tends, through the various connections just described, to partially revolve the clutch-drum, this operation being against the tension of spring 73, and on the release of the rock-shaft 50 from the check-row wire said spring 73 will force the parts to normal position, as will be evident.

A number of depressions 64 are formed about the surface of the clutch-drums, being arranged in lineal series in such a manner that one series will include a number of depressions arranged in line around the surface of the drum and spaced equally apart, while a second and third series will include similar depressions arranged in their respective lines, but spaced a varying distance apart from the first series and from each other. Thus the surface of the drum in the instance illustrated carries three series of depressions, the depressions of each series being positioned at different distances apart from the neighboring series. I have shown the middle series of depressions as formed by continuing every other one of the outer or first series of depressions, though this is simply a mechanical expedient, and I contemplate forming the series of depressions in any desired position or arrangement.

The operating-lever 74, pivotally supported on the runner-frame 1, has a bifurcated or forked end 75 to embrace the clutch-drum hub 54 in recess 55, the handle end of the lever projecting within convenient reach of the operator's seat 76. A notched segment 77 of ordinary construction to be engaged by the lever serves to hold the lever against accidental movement when adjusted.

It will be seen that movement of the lever will shift or slide the clutch-drum 53 on shaft 44 so as to bring any desired series of depressions 64 beneath the roller 63, and this adjustment is the vital principle of the present invention, as it serves the important function of regulating the length of travel of the seed-cup disk, and hence controls the quantity of seed delivered at one operation, as will be seen hereinafter. The post 57 is provided with an offset or shoulder 78 to receive one end of a coil-spring 79, the opposite end of which bears beneath arm 60, with the effect to normally hold the pawl 62 disengaged from the ratchet-wheel 56. The arrangement and construction are such that when the roller 63 is resting in a recess or depression 64 the pawl 62 is disengaged from ratchet-wheel 56, which is the normal position of the parts, such as maintained by spring 79; but when the roller rides upon the surface of the drum the pawl is forced into engagement with the ratchet-wheel, this being the operative position of the parts and being maintained against the tension or spring 79, as will be evident.

As the seed-distributing mechanism operates practically identical with the mechanism described in my patent referred to, no further description of such is deemed necessary herein, the main part of the present invention residing in the clutch mechanism. Assuming the parts assembled as described and in normal position, the forward travel of the planter serves to bring one of the buttons on the check-row wire into position to rock the shaft 50. This movement of shaft 50, through the described connection between it and the drum, serves to partially rotate the latter, forcing roller 63 out of its depression 64 onto the peripheral surface of the drum and forcing pawl 62 into engagement with ratchet-wheel 56. This locks post 57 to the ratchet-wheel, and as said part is fixed to shaft 44 and the ratchet-wheel is fixed to the continuously-driven sprocket 48 the shaft 44 is revolved, and through pinions 45 on said shaft the seed-distributing mechanism is actuated. The movement of shaft 44 will continue until roller 63 rides into the next succeeding depression 64, when spring 79 will force the roller into said depression and disengage the pawl and ratchet, relieving shaft 44 from the driving influence of sprocket-wheel 48. After the particular button on the check-row wire acts to affect the rock-shaft the latter returns to normal position through the influence of spring 73, which spring also operates the connection between the rock-shaft and clutch-drum to return the latter to normal position, thus reseating roller 63 in its original depression. This reseating operation being in a similar direction to the movement of ratchet 48 and very rapid will not cause operative engagement of the pawl and ratchet, as will be understood.

As the seed-cup disk will revolve only during operation of the clutch-shaft 44 and will only discharge seed during its revolution, it follows that if the revolution of shaft 44 can be regulated the quantity of seed discharged may be regulated. I gain this regulation by shifting the clutch-drum to bring a particular series of depressions 64 into line with roller 63. As the depressions of the different series are differently spaced apart, it will be clearly evident that I can control the length of time the roller is riding upon the peripheral surface of the clutch-drum, hence regulating the length of time the pawl and ratchet are in operative engagement. This engagement above controls the revolution of the shaft 44 and revolution of the seed-cup disk, and therefore by bringing a particular series of depressions 64 beneath the roller 63 I am enabled to revolve the seed-cup disk to discharge from, say, two cups, while another series of depressions will maintain revolution of the seed-cup disk to discharge from, say, four pockets. It remains a simple matter, therefore, to regulate the distances between the depressions of the respective series to gain practically all desirable variations in the quantity of seed discharged.

It will be noted that the single lever 74 controls the entire mechanism and may be effectively operated while the planter is in operation.

To provide for constant drilling when such is deemed necessary, I form a shoulder 80 (see Fig. 13) on post 57 to receive one end of a set-screw 81, threaded through a lip 82, projecting from rod 59 in the same direction as roller-arm 61. By setting screw 81 to force lip 82 and shoulder 80 apart the roller 63 is prevented from entering any of the depressions 64 in the clutch-drum and pawl 62 is held in engagement with ratchet-wheel 56, causing a continuous revolution of shaft 44, and hence a continuous discharge of seed until screw 81 is withdrawn.

To prevent a reverse movement of shaft

44, I provide a pawl-and-ratchet mechanism 83, depending from the hopper 7, as shown in Fig. 5.

The drum may be laterally adjusted, as described, without interfering with the connection from the rock-shaft, as eye 70 is slidably mounted on stud 71 to furnish the necessary lateral movement, as will be noted.

Though the specific form and arrangement of detailed parts as above described is the preferred construction, yet many mechanical changes may be made without destroying the vital characteristics of the invention, and I regard all such changes as within the spirit and scope of my invention.

In my copending application filed September 17, 1904, Serial No. 224,816, I have shown a specifically different construction of mechanism for variably operating the seed-dropper, and the claims therein cover such specifically different construction and subordinate combinative features. The claims of the present application are directed to the broad combination between the dropping and driving means and controlling connections and to the specific construction of controlling connections shown herein.

Having thus described the invention, what is claimed as new is—

1. In a seed-planter, the combination of a seed-dropper, intermittently-operating means for driving the seed-dropper, and means for setting the driving means for operation for varying predetermined periods.

2. A seed-dropper, and driving means for intermittently operating the dropper, said driving means being governable to control the amount of seed ejected by the dropper at each operation thereof.

3. A seed-dropper provided with a movable dropping element having a step-by-step movement and provided with means for dropping a determined amount of seed at each step or stage in its course of travel, driving means for operating the dropper at predetermined intervals, and means for varying the action of said driving means to adapt it to periodically operate the dropper a plurality of steps, whereby the amount of seed deposited by the dropper at each operation thereof may be governed, substantially as described.

4. A continuously-driven shaft, an intermittently-driven shaft, a dropper operated by the intermittently-driven shaft, drive-gearing between the shafts including a clutch device for connecting said shafts, and means for setting the clutch device to connect the shafts for varying periods.

5. In combination, a seed-dropper, operating means therefor, and a controlling element for regulating the action of the operating means to drive the dropper for varying determined periods, thereby effecting the ejection of more or less seed by the dropper.

6. The combination of a seed-dropper, a continuously-rotating shaft, an intermediately rotatable shaft, gearing between said shaft, including clutch mechanism, means for actuating the clutch mechanism to connect the two shafts, and means for varying the period of connection of the shafts through the clutch element.

7. The combination of a seed-dropper, a continuously-driven shaft, an intermittently-drivable shaft, gearing between said shafts including clutch mechanism, means for actuating said clutch mechanism to connect the two shafts, and means forming part of said clutch mechanism to adapt the same for connecting the shafts for varying periods.

8. The combination of a dropper, a continuously-driven shaft, an intermittently-drivable shaft to operate the dropper, gearing between said shafts including a clutch mechanism comprising two elements and a connecting element, one of said two first-named elements being adjustable toward and from the other element to bring the connecting element into operation, means for adjusting said movable element, and means for varying the period of connection of the two shafts by the clutch mechanism through a variable action of the connecting element.

9. The combination of a seed-dropper, an intermittently-drivable shaft for operating the same, a continuously-driven power-shaft, gearing between said two shafts comprising clutch mechanism, means for throwing said clutch mechanism into and out of action, and means for maintaining the parts thereof in action for varying predetermined intervals.

10. The combination of a seed-dropper, intermittently-drivable means for operating the same, continuously-driven power means, an operating connection between the power means and intermittently-drivable means for periodically effecting the operation of the latter, said connection including clutch mechanism, means for throwing the parts of the clutch mechanism into and out of action and maintaining the same in action during predetermined intervals, and means for regulating the parts of the clutch to vary such intervals.

11. In a seed-planter, seed-distributing mechanism, a shaft for operating said mechanism, a power-wheel loose on said shaft, a continuously-driven shaft in constant engagement with said power-wheel, a clutch between the first-named shaft and the power-wheel, means for throwing the clutch into and out of action, and means for varying the period of action of the clutch.

12. In a seed-planter, seed-distributing mechanism, an operating-shaft for driving said mechanism, a continuously-driven power-wheel loosely mounted on said shaft, a continuously-driven power-shaft in constant gear with said power-wheel, a clutch to intermittently connect the power-wheel and operating-shaft, an automatically-operated rock-shaft to throw the clutch into and out of action, and means for adjusting the clutch to adapt the same for connecting the power and operating shafts for varying predetermined periods.

13. In a device of the class described, a rotary operating-shaft, a driving member mounted idly on the shaft, a clutch member movable on the shaft to engage said driving member, and means for maintaining the clutch and driving member in engagement during predetermined intervals.

14. In a device of the class described, a rotary operating-shaft, a drive member mounted idly on the shaft, a clutch member loose on the shaft and adjustable into and out of engagement with said drive member, said clutch member being provided with a plurality of depressions, and a movable element adapted to engage the drive member and coöperate with said depressions to maintain the clutch and drive members in operative engagement during predetermined intervals.

15. In a seed-planter, seed-distributing mechanism, a shaft geared thereto, a continuously-operated power-wheel loosely mounted on said shaft, a clutch-drum loose on said shaft, means fixed to the shaft arranged for connection with the power-wheel, and a rock-shaft to partially rotate the drum and force said means into connection with the power-wheel.

16. In a seed-planter, seed-distributing mechanism, a shaft geared thereto, a continuously-driven power-wheel loosely mounted on the shaft, a clutch to intermittently connect the shaft and power-wheel, a rock-shaft operative to set the clutch, means for varying the time of operative connection between the clutch and power-wheel, and means carried by the clutch to automatically release it.

17. In a seed-planter, seed-distributing mechanism, a shaft geared thereto, a continuously-operated power-wheel loosely mounted on the shaft, a clutch-drum loosely mounted on the shaft, a post fixed to the shaft and arranged for engagement with the power-wheel, means carried by the post for operative contact with the drum to lock the post and power-wheel together, and a rock-shaft to partially rotate the drum and operate the said means.

18. In a seed-planter, seed-distributing mechanism, a shaft geared thereto, a continuously-operated power-wheel loosely mounted on the shaft, a clutch-drum loosely mounted on the shaft, a post fixed to the shaft, an arm carried by the post, a pawl at one end of the arm to engage the power-wheel, a roller at the opposite end of the arm to engage with the drum, and a rock-shaft to partially rotate the drum to elevate the roller and force the pawl into engagement with the power-wheel, the drum being formed with a depression to receive the roller and disengage the pawl and power-wheel.

19. In a seed-planter, seed-distributing mechanism, a shaft geared thereto, a continuously-operated power-wheel loosely mounted on the shaft, a clutch-drum loosely mounted on the shaft, a post fixed to the shaft, an arm carried by the post, a pawl at one end of the arm to engage the power-wheel, a roller at the opposite end of said arm to engage with the drum, said drum being formed with a series of depressions to normally receive the roller, and a rock-shaft to partially rotate the drum and force the roller out of its depression and disengage the pawl and power-wheel.

20. In a corn-planter, a seed-distributer, a shaft geared thereto, a continuously-driven power-wheel loosely mounted on said shaft, a drum loose on the shaft and formed with a plurality of series of depressions in its surface, the depressions of the respective series being differently spaced, means to operatively connect the power-wheel and shaft, said means being operated by the surface of the drum and held inoperative by the depressions therein, and a rock-shaft to partially rotate the drum.

21. In a corn-planter, a seed-distributer, a shaft geared thereto, a continuously-driven power-wheel loosely mounted on said shaft, a drum loose on the shaft and formed with a plurality of series of depressions in its surface, the depressions of the respective series being differently spaced, means to operatively connect the power-wheel and shaft, said means being operated by the surface of the drum and held inoperative by the depressions therein and a rock-shaft to partially rotate the drum, and means to adjust the drum to arrange any one of the series of depressions in operative relation to said connecting means.

22. In a corn-planter, a seed-distributer, a shaft geared thereto, a continuously-driven power-wheel loosely mounted on said shaft, a drum loose on the shaft and formed with a plurality of series of depressions in its surface, the depressions of the respective series being differently spaced, means to operatively connect the power-wheel and shaft, said means being operated by the surface of the drum and held inoperative by the depressions therein and a rock-shaft to partially rotate the drum, and a lever to adjust the drum to arrange any one of the series of depressions in operative relation to said connecting means.

In testimony whereof I affix my signature in presence of two witnesses.

WILLIAM H. SANDIFUR.

Witnesses:
   CHAS. R. NEARING,
   JOSEPH D. REED.